March 15, 1949.   P. H. TRICKEY   2,464,756
DUAL CAPACITOR MOTOR
Filed April 23, 1946

Inventor
PHILIP H. TRICKEY
by Joel G. Stanford
Attorney

Witness:
N. Leszczak

Patented Mar. 15, 1949

2,464,756

UNITED STATES PATENT OFFICE 2,464,756

DUAL CAPACITOR MOTOR

Philip H. Trickey, North Plainfield, N. J., assignor to The Singer Manufacturing Company, Elizabeth, N. J., a corporation of New Jersey Application April 23, 1946, Serial No. 664,173

8 Claims. (Cl. 318—221)

1

This invention relates to electric motors and more particularly to those motors which are supplied from a single phase source of energy, have main and auxiliary stator windings displaced from each other in space phase, and employ separate phase-shifting means, preferably capacitors, for establishing a time phase displacement between the currents in said stator windings under both starting and running conditions.

The problem of making capacitor motors which will have both good starting and good running characteristics has been recognized for many years. Attempts to solve it have resulted in bulky, expensive auto-transformer and switching arrangements for altering the effective capacitor volt-amperes between starting and running conditions or in the use of two special capacitors, one for starting only and the other for running. The last-mentioned means is effective but, in the arrangements thus far suggested, does not take full advantage of the optimum relation between the series turns of main and auxiliary windings and especially of the different requirements in this respect as between starting and running conditions.

It is a primary object of this invention, therefore, to provide a dual-capacitor motor which shall provide good starting and running characteristics without the use of auxiliary devices and with optimum and different turn ratios provided for running as compared with starting conditions.

It is well recognized that, for general application, the best ratio of series auxiliary winding turns to series main winding turns for a capacitor motor employing an electrolytic condenser, where starting performance alone is considered does not vary much from one. It is also known that, where running performance alone is considered for a capacitor motor employing a paper condenser, the best ratio of auxiliary winding to main winding series turns does not vary much from two. The criterion upon which is based these optimum ratios is good motor performance consistent with reasonable cost and size of available condensers. For example, a lower series turn ratio than specified above would result in the application of insufficient voltage to the condenser and thus it could not utilize its full available volt-ampere rating. On the other hand, a higher series turn ratio would impose too high a voltage for standard rated condensers and would thus require the much more expensive and larger special condensers of higher voltage ratings.

In the solution of this problem according to the present invention, use is made of tapped auxiliary and/or main windings. The starting and the running condensers are each connected across

2 different portions of the main and auxiliary windings of the same single motor to form closed series loops in which the ratio of series auxiliary to series main winding turns is the optimum for the specific type of condenser used. For starting service, where the duty is intermittent and large values of capacitance are required, the electrolytic condenser is especially suitable because of its small size and cost, if the voltages encountered are not too high. For continuous running service, where the capacitance values required are smaller, the paper condenser is more suitable because it is more efficient and has a much longer life on the continuous voltage duty. As the voltage rating is increased, both condensers cost more and are larger per volt-ampere capacity after a certain limiting voltage is reached and the electrolytic type reaches its limiting voltage at a lower value than does the paper type of condenser. There is, therefore, a small and different range of voltage within which the condensers should be operated to yield their maximum volt-ampere capacity consistent with cost, size and useful life.

It has been found in practice that the best voltage range for 115 volt line service is between 130 and 144 volts for the electrolytic condensers and between 270 and 330 volts for the paper condensers. To provide, in a single motor, both types of condensers with the optimum voltage applied to each, individually, has not heretofore been accomplished.

It is a further object of this invention, therefore, to provide a dual-capacitor motor in which the proper ratios of series auxiliary to series running winding turns are used to secure the optimum individual condenser voltages with relation to their size, cost, and life.

With the above and other objects in view, as will hereinafter appear, the invention comprises the devices, combinations and arrangement of parts hereinafter set forth and illustrated in the accompanying drawings of a preferred embodiment of the invention, from which the several features thereof and the advantages attained thereby will be readily understood by those skilled in the art.

In the accompanying drawings, Fig. 1 is a diagrammatic illustration of a motor circuit embodying the invention.

Figure 1:
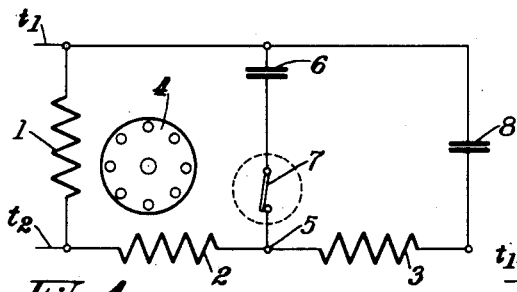

Referring now to Fig. 1, the motor comprises a main stator winding 1, an auxiliary stator winding comprising parts 2 and 3, and a closed-circuited squirrel-cage induction rotor 4. Main winding 1 is connected across line terminals $t_1$—$t_2$ which are connected, for motor operation to a source of single-phase alternating current energy (not shown).

Main winding 1 and auxiliary winding 2—3 are disposed on the stator at a space phase angle to each other, preferably of 90 electrical degrees and the auxiliary winding has a mid-tap 5 which divides said winding into two equal series-connected parts 2 and 3. Said mid-tap may, for example, be conveniently made between poles.

Windings 1, 2 and 3 each comprise approximately the same number of effective series turns but may employ different wire sizes.

An electrolytic condenser 6 is connected in series with a switch 7, to form a circuit which is connected between line terminal $t_1$ and mid-tap 5. Switch 7 may be any one of the conventional cut-out devices responsive to motor speed or current input and is well known in the art. A paper condenser 8 is connected between line terminal $t_1$ and the free end of winding 3.

It will be seen that the connections indicated above provide two closed series loops. One such loop, which may be termed the starting loop, comprises main winding 1, electrolytic condenser 6, switch 7 and portion 2 of the auxiliary winding. The other series loop, which may be termed the running loop, comprises main winding 1, paper condenser 8 and auxiliary winding portions 3 and 2. It will also be noted that, for the starting series loop, the ratio of effective turns of the auxiliary winding included therein to the effective turns of the main winding included therein is approximately one. For the running series loop, the ratio of effective turns of the auxiliary winding included therein to the effective turns of the main winding included therein is approximately two.

The two loops described above form, with the common closed-circuited rotor, in effect, two motor elements. One motor element, containing the electrolytic condenser, is designed primarily for good starting characteristics, and the other motor element, containing the paper condenser, is designed primarily for good running performance. During the starting period, the current taken by the paper condenser is negligible compared to that taken by the electrolytic condenser and no starting current unbalance occurs. The loop containing the electrolytic condenser is opened by the switch 7 after starting is completed, thus to prevent any running current unbalance.

Figure 2:
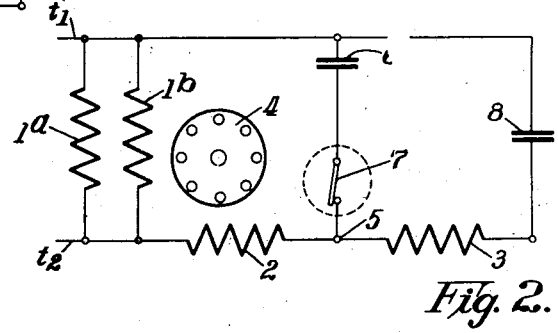
Fig. 2 shows a circuit for a dual-voltage motor connected for low voltage operation and embodying the invention.
Figure 3:
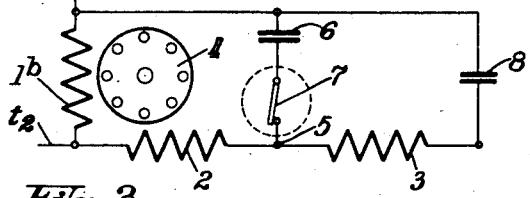
Fig. 3 shows the circuit for the motor of Fig. 2 reconnected for high-voltage operation.

Figs. 2 and 3 show a dual-voltage capacitor motor connected for low and high voltage respectively and embodying the invention. In Fig. 2 the main winding comprises two elements $1^a$ and $1^b$ connected in parallel across the line terminals $t_1$—$t_2$. In Fig. 3, the main winding elements $1^a$ and $1^b$ are reconnected in series for application of the higher voltage in accordance with practice well known in the art. The same starting and running loop circuits are provided in the connections of Figs. 2 and 3 as for those of Fig. 1 and the advantages of the optimum turn ratios are thus provided regardless of whether the motor is connected for low or for high voltage operation.

While, for the majority of applications, the aforesaid turn ratios of approximately one for the starting loop and two for the running loop represent optimum practice, this is not necessarily always true. Under certain conditions, where the voltages do not work out well with these ratios, as for example, when using rotors having abnormally high or low winding resistances to gain exceptional starting or running performance, it may be necessary to alter the values of these ratios and it is to be understood that connections for accomplishing this are included within the scope of this invention. Accordingly, Figs. 4 and 5 illustrate connections for dual capacitor motors, which connections are modified from that shown in Fig. 1 so that different voltages may be individually applied to the condensers.

Figure 4:
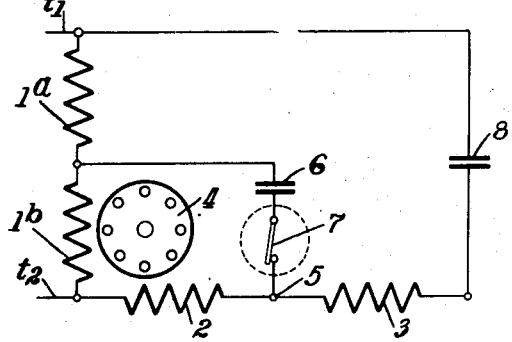
Fig. 4 shows a modification of the motor circuit of Fig. 3.

In Fig. 4, the main winding comprises two series-connected elements $1^a$ and $1^b$ and the auxiliary winding contains two series-connected elements 2 and 3. Elements $1^a$, $1^b$, 2 and 3 each preferably have approximately the same number of effective turns. The starting series loop contains main winding element $1^b$, electrolytic condenser 6, switch 7 and auxiliary winding element 2. The running loop consists of the full main winding $1^a$ and $1^b$, paper condenser 8, and the full auxiliary winding 2 and 3. This connection, for example, may be used on double line voltage so that regular low-voltage electrolytic condensers may be used and still have high voltage on the paper condenser. In effect, the starting motor element and the running motor element have the same turn ratios but the starting motor element operates at half voltage relative to the running motor element.

Figure 5:
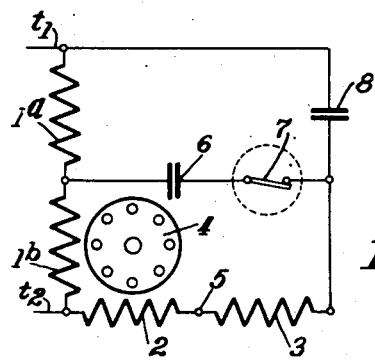
Fig. 5 shows a further modification of the motor circuit of Fig. 3.

In Fig. 5 the same running loop as in Fig. 4 is used having a turn ratio of approximately one, but the starting loop now includes the free auxiliary winding and its turn ratio is, therefore, approximately two. This connection may also be used for double voltage service.

Although the circuit of Fig. 1 indicates tapping of the auxiliary winding at the mid-point 5, and represents the most common practice, this invention is not to be construed as so limited but includes within its scope tapping of the auxiliary winding at any point found to yield desirable voltages at the condensers. For example, in a four-pole motor it would be convenient to tap at the one-quarter and the three-quarter point.

From the foregoing it will be perceived that I have provided a capacitor motor employing an electrolytic starting condenser and a paper running condenser, each contained in a closed series loop circuit including main and auxiliary winding turns in such ratio as to apply voltages to said condensers which are within the optimum ranges.

It is to be understood that various other changes may be made in the construction, arrangement and interrelation of the parts constituting the invention without departing from the spirit thereof; and the same is not limited to the form shown. Reference will therefore be had to the appended claims for a definition of the limits of the invention.

Having thus set forth the nature of the invention, what I claim herein is:

1. In a capacitor motor, main and auxiliary stator windings disposed at a space angle to each other, a first condenser forming with main and auxiliary winding turns a first closed series loop, and a second condenser forming with said main and auxiliary winding turns a second closed series loop including, as the sole added winding element extended auxiliary winding turns independent of said first closed series loop.

2. In a capacitor motor, main and auxiliary stator windings disposed at a space angle to each other, an electrolytic condenser forming with main and auxiliary winding turns a first closed series loop, a paper condenser forming with said main and auxiliary winding turns a second closed series loop including, as the sole added winding element extended auxiliary winding turns independent of said first closed series loop, and means responsive to a condition of said motor to open said first closed series loop.

3. In a capacitor motor, main and auxiliary stator windings disposed at a space angle to each other, an electrolytic condenser connected in series with a cut-out device and forming with main and auxiliary winding turns a normally closed series starting loop, an electrostatic condenser forming with said main and auxiliary winding turns a permanently closed series running loop including, as the sole added winding element, extended auxiliary winding turns independent of said normally closed series loop, and means responsive to a condition of said motor for opening said cut-out device.

4. In a capacitor motor, main and auxiliary stator windings disposed at a space angle to each other, an electrolytic condenser and a switch connected in series to form with main and auxiliary winding turns a first series loop, and a paper condenser forming with said main and auxiliary winding turns a second series loop including, as the sole added winding element, extended auxiliary winding turns independent of said first series loop, said switch being responsive to a condition of said motor to open and close said first series loop and said second series loop being closed under all conditions of said motor.

5. In a capacitor motor, main and auxiliary stator windings disposed at a space angle to each other, a closed-circuited rotor, an electrolytic condenser forming with main and auxiliary winding turns and said rotor a starting motor element and a paper condenser forming with said main and auxiliary winding turns and said rotor a running motor element including, as the sole added winding element, extended auxiliary series winding turns independent of said starting motor element.

6. A capacitor start and run induction motor comprising first and second line terminals, a main winding connected across said line terminals, an auxiliary winding having twice as many effective turns as the main winding, connected at one end to said second line terminal, and provided with a center tap, a first condenser connected between said first line terminal and said center tap, a second condenser connected between said first line terminal and the free end of said auxiliary winding, and means for opening the circuit to said electrolytic condenser at a predetermined motor condition.

7. A capacitor start and run induction motor comprising first and second line terminals, a main winding connected across said line terminals and provided with a mid-tap, an auxiliary winding having approximately the same number of turns as the main winding, connected at one end to said second line terminal, and provided with a mid-tap, a first condenser connected between the mid-taps of each of said main and auxiliary windings, a second condenser connected between said first line terminal and the free end of said auxiliary winding, and means for opening the circuit to the first condenser at a predetermined motor condition.

8. A capacitor start and run induction motor comprising first and second line terminals, a main winding connected across said line terminals and provided with a mid-tap, an auxiliary winding, having approximately the same number of turns as the main winding and connected at one end to said second line terminal, an electrolytic condenser connected between the mid-tap of said main winding and the free end of said auxiliary winding, a paper condenser connected between said first line terminal and the free end of said auxiliary winding, and means for opening the circuit to the electrolytic condenser at a predetermined motor condition.

PHILIP H. TRICKEY.

REFERENCES CITED

The following references are of record in the file of this patent:

UNITED STATES PATENTS

| Number | Name | Date |
|---|---|---|
| 2,243,070 | Cain | May 27, 1941 |